United States Patent
Shigeura

[11] Patent Number: 6,093,106
[45] Date of Patent: Jul. 25, 2000

[54] FLEXIBLE COUPLING

[75] Inventor: Junichi Shigeura, Tokyo, Japan

[73] Assignee: Mitsubishi Denki Kabushiki Kaisha, Tokyo, Japan

[21] Appl. No.: 08/960,055

[22] Filed: Oct. 29, 1997

[30] Foreign Application Priority Data

Feb. 20, 1997 [JP] Japan .................................. 9-036349

[51] Int. Cl.⁷ ........................................................ F16D 3/18
[52] U.S. Cl. ........................... 464/158; 464/154; 74/462
[58] Field of Search .................................... 464/153, 154, 464/157, 158, 159; 192/114 T, 70.2; 74/462; 403/359.6, 359.2

[56] References Cited

U.S. PATENT DOCUMENTS

| | | | |
|---|---|---|---|
| 2,823,527 | 2/1958 | Belden et al. | 464/158 |
| 2,841,966 | 7/1958 | Belden et al. | 464/158 |
| 2,874,817 | 2/1959 | Altmann | 192/114 T |
| 2,922,294 | 1/1960 | Wildhaber | 464/158 |
| 2,927,510 | 3/1960 | Wildhaber | 464/158 |
| 3,013,411 | 12/1961 | Wahlmaek | 464/158 |
| 3,243,973 | 4/1966 | Kraeling | 464/154 |
| 3,292,390 | 12/1966 | Wildhaber | 464/158 |
| 3,331,217 | 7/1967 | Wildhaber | 464/158 |
| 3,613,395 | 10/1971 | Shigeura . | |
| 3,982,444 | 9/1976 | Rouverol | 74/462 |
| 4,969,371 | 11/1990 | Allen | 464/158 |

FOREIGN PATENT DOCUMENTS

| | | |
|---|---|---|
| 1 296 894 | 6/1969 | Germany . |
| 1095861 | 12/1967 | United Kingdom . |
| 1112283 | 5/1968 | United Kingdom . |

Primary Examiner—Terry Lee Melius
Assistant Examiner—Greg Binda
Attorney, Agent, or Firm—Burns, Doane, Swecker & Mathis, LLP

[57] ABSTRACT

The tooth shape at around the pitch circle of the outer tooth gear of the pinion to be connected to the prime mover or driven shaft has a tooth surface which is in axial direction at around the central portion of the tooth width and which contacts at around the tooth width end at the allowable displacement angle and the backlash is made small and the outer tooth gear of the pinion is crowned in to an exponential function curve. The precession vibration and the torsional vibration at a high speed rotation can be suppressed because of the small backlash. The crowning curve is exponential function which causes the contacting point to move toward the tooth width end as the displacement increases and the radius of curvature becomes larger as the point on the curve approaches to the tooth width end, so that even when the contacting gear number decreases when displaced, the increase in the contacting stress is suppressed and a larger power can be transmitted as compared to the conventional design.

7 Claims, 6 Drawing Sheets

FLEXIBLE COUPLING

BACKGROUND OF THE INVENTION

This invention relates to a flexible coupling for freely rockably coupling a rotary shaft of an electric motor of an electric locomotive and a driven shaft of a gear unit incorporated into wheels on the bogie.

The bogie of an electric locomotive comprises a spring between the wheels and the bogie frame for a comfortable ride. The electric motor is mounted to the bogie frame and the gear unit for driving the axle is incorporated into the wheel shaft. Therefore, a flexible coupling is provided between the sprung electric motor and the unsprung gear unit in order that the shakes, vibrations and noise may not be directly transmitted to the motor side.

Figure 7:
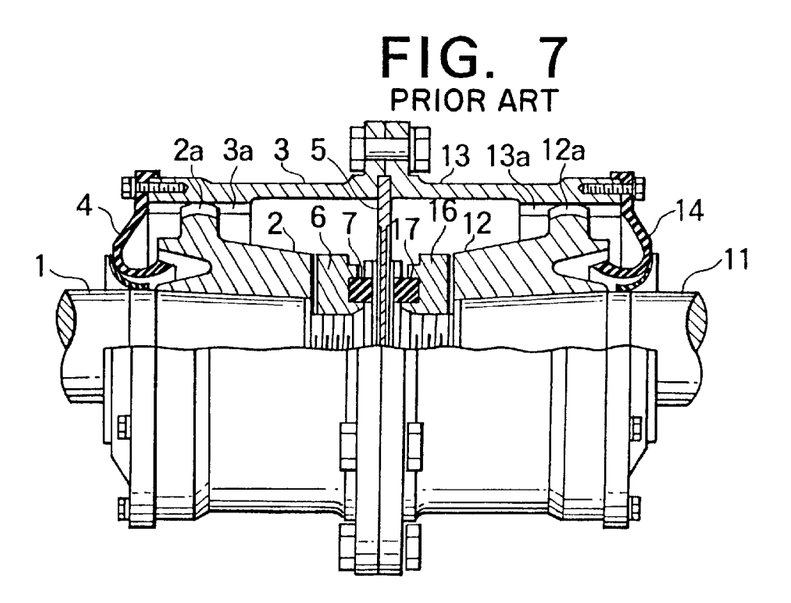
FIG. 7 is a sectional view showing the structure of a conventional flexible coupling.

An example of the structure of the conventional flexible coupling is disclosed in Japanese Utility Model Publication No. 47-14804. FIG. 7 is a sectional view of this flexible coupling. In the FIG. 7, 1 and 11 are rotary shafts, 2 and 12 are pinions secured to the rotary shafts 1 and 11 and each has formed thereon a crowned outer teeth gear 2a or 12a. Sleeves 3 and 13 are fastened together by bolts and have formed inside inner teeth gears 3a and 13a which are in mesh with the outer teeth gears 2a and 12a of the pinions 2 and 12. End cover 4 and 14 are secured to the sleeves, respectively at one end and extend at the other ends into an annular groove formed in the securing portion of the pinions 2 and 12.

A partition plate 5 is inserted between the joining surfaces of the sleeves 3 and 13 for partitioning the sleeves 3 and 13 from each other. Shaft end nuts 6, 16 are for securing the pinions 2 and 12 onto the rotary shafts 1 and 11, and 7 cushions 7 and 17 are secured to the end shaft nuts 6 and 16 for positioning the shaft end nuts 6 and 16 relative to the partition plate 5 for establishing a proper engagement between the inner teeth gears of the sleeves 3 and 13 and the outer teeth gears of the pinions 2 and 12. The flexible coupling of the above structure is connected to a motor rotary shaft at either the rotary shaft 1 or 11 and to the gear unit combined with the wheel shaft of the bogie.

Figure 8:
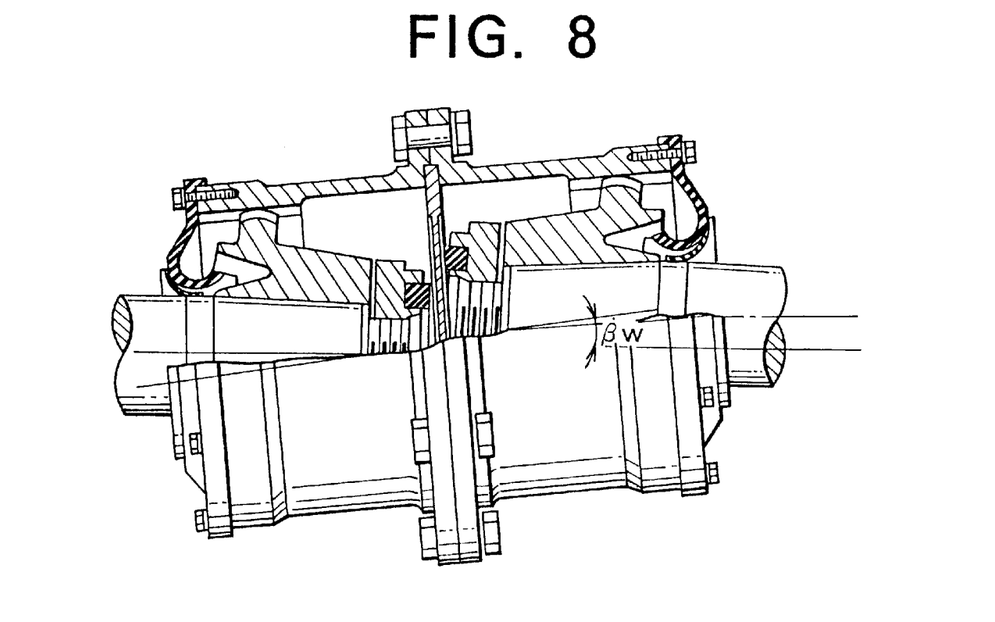
FIG. 8 is an explanatory view for explaining the displacement of the rotary shafts of the flexible coupling.

In the conventional flexible coupling of the above construction, when the axes of the rotary shaft of the electric motor and the gear unit incorporated into the axle come out of alignment, such as when the bogie shakes during the travel of the electric locomotive, the axes of the pinions 2 and 12 at the opposite ends of the coupling displace as shown in FIG. 8. Even when such displacement occurs the crowned outer teeth gears 2a and 12a of the pinions 2 and 12 always engage the inner teeth gears 3a and 13a of the sleeves 3 and 13, to thereby to achieve smooth transmission of the driving power.

In recent years, the speed of the electric locomotive has been significantly increased by increasing the rotational speed of the electric motor and by decreasing the size of the motor to make the overall vehicle weight small. While the increase of the motor speed significantly contributes to the decrease in weight, it also causes vibrations and noise to increase, whereby the comfort of the locomotive ride is degraded. When the motor speed increases and the flexible coupling is being driven at a high speed, precession vibration or torsional vibration may occur because the sleeves are rockable due of the backlash between the meshing portions of the gears of the pinions 2 and the sleeves 3 and because of the possible unbalance as a rotating body.

Figure 9:
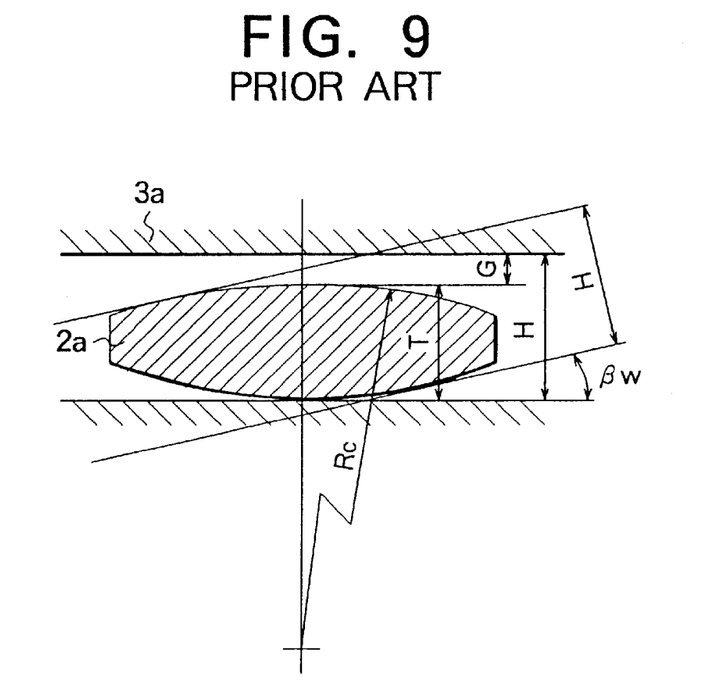
FIG. 9 is an explanatory view of the shape of a conventional flexible coupling.
Figure 10A:
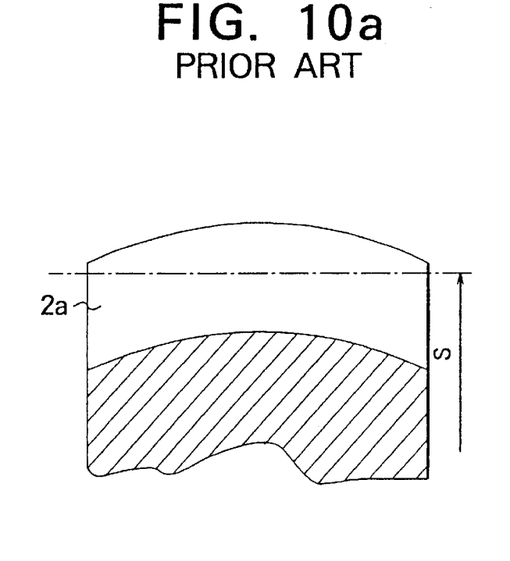
FIG. 10 is a side view of FIG. 7.
Figure 10B:
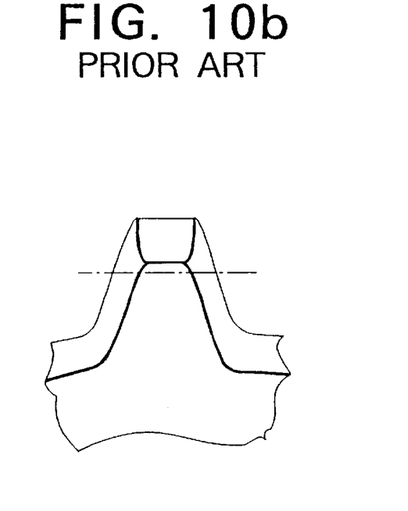

The conventional crowning of the gears of the flexible coupling is as shown in FIG. 9. FIG. 10 is a side view of the outer teeth gear of the pinion 2. In FIG. 9, 3a is an inner teeth gear of the sleeve 3 and 2a is an outer teeth gear of the pinion 2. As shown in FIG. 10(a), the outer teeth gears 2a of the pinion 2 are rounded by machining so that they smoothly mesh with the inner teeth gears on the sleeves even when the pair of the rotary shafts come out of alignment relative to each other. Also, they are crowned in the tooth thickness direction as shown in FIG. 9 showing the cross section along the pitch circle cylinder.

In these figures, S is the pitch circle diameter, T is the tooth thickness at the pitch circle diameter S of the outer tooth gear 2a of the pinion 2, H is the inner tooth clearance at the pitch circle diameter S of the inner tooth gear 3a of the sleeve 3, G is the backlash, $R_c$ is the radius of the crowning of the outer tooth gear 2a, $\beta_w$ is the allowable displacement angle between the center lines of the sleeve 3 and the pinions 2, and β is the displacement angle. The backlash G at the pitch circle diameter S is expressed by the equation 8 given below and the dimensional relationship between the outer tooth gear 2a and the inner tooth gear 3a at the pitch circle diameter S is expressed by the equation 9 given below.

$$G=(2\cdot R_c-T)\cdot(1-\cos \beta_w) \quad \text{(Equation 8)}$$

$$R_c=(1/2)\cdot\{[G/(1-\cos \beta_w)]+T\} \quad \text{(Equation 9)}$$

where, $R_c$: radius of crowning curve

G: backlash $\beta_w$: allowable displacement angle

T: tooth thickness

Figure 11:
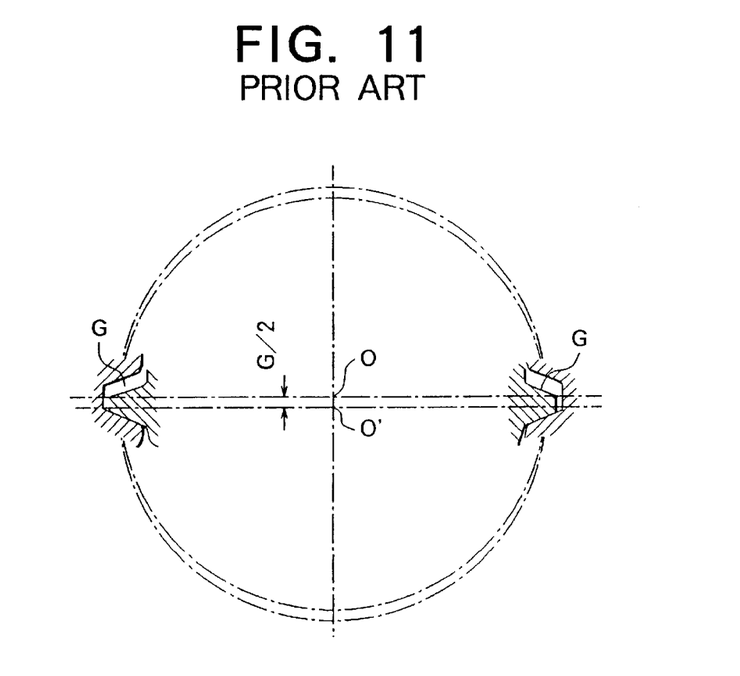
FIG. 11 is an explanatory view for explaining how the outer tooth gear of the pinion and the inner tooth gear of the sleeve of the conventional flexible coupling are engaged.

In the flexible coupling of this construction, in order to give a necessary allowable displacement angle $\beta_w$, the angle of the tangent line at the tooth width end of the crowned surface at the pitch circle S of the outer tooth gear of the pinion 2 relative to the axis of the pinion 2 should be equal to the allowable displacement angle $\beta_w$, and the gap between the outer tooth gear and the inner tooth gear at the pitch circle diameter S when the displacement angle β should be equal to the backlash G, and it was necessary that G=0.8–1.2 mm in order that the allowable displacement angle $\beta_w$ be 0.1 ($\beta_w$=about 6 degrees), for example. FIG. 11 shows the state of engagement when the allowable displacement angle is $\beta_w$.

Thus, the engagement in the direction perpendicular to the direction of displacement is in the state in which the backlash G generates, and the center of rotation of the sleeve 3 displaces within the range of the backlash G, thereby generating an unbalance as a rotating body which may cause the precession vibration and the torsional vibration due to the play in the direction of rotation.

Figure 12:
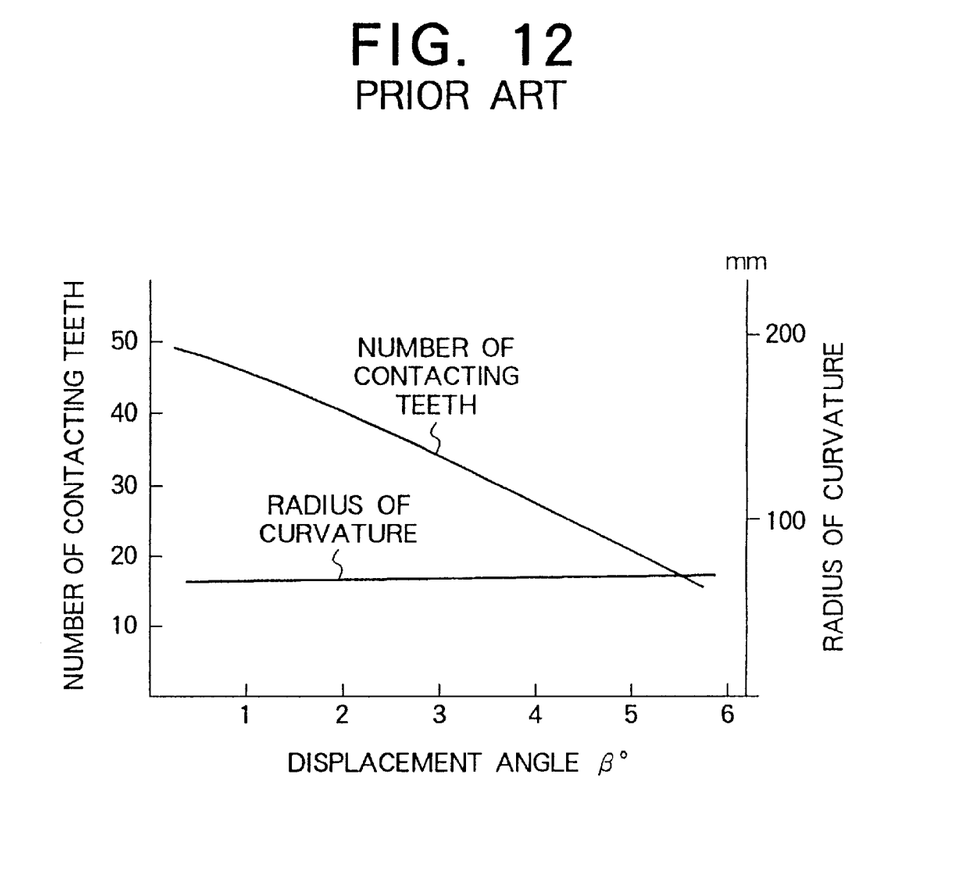
FIG. 12 is a view showing the relation ship between the displacement angle of the engagement portion and the simultaneous contacting tooth number and the radius of curvature of the conventional flexible coupling.

Also, in the typical crowned gear flexible coupling, the number of teeth of the sleeve 3 or pinion 2 which are in simultaneous contact with each other decreases as the displacement angle β increases when the flexible coupling transmitting a constant force rotates. One example of this phenomenon is illustrated in FIG. 12. In the conventional flexible coupling, the gear teeth are crowned at a constant radius of curvature $R_c$, so that, as the number of the simultaneously contacting teeth decreases, the contacting stress at the tooth surface inverse proportionally increases, increasing the possibility of roughening and damaging the tooth surface.

As described above, the tooth surface is crowned at a constant radius of curvature in the conventional flexible coupling and the backlash defined between the meshing portions of the outer tooth gear of the pinion and the inner tooth gear of the sleeve is made large in order to establish a necessary allowable displacement angle, so that precession vibration and torsional vibration appear as the rotational speed increases to degrade the comfort of ride of the electric locomotive, making it impossible to increase the rotational speed.

Also, since the conventional flexible coupling in which the gear is crowned at a constant radius of curvature has a large backlash, the number of the simultaneously meshing teeth decreases as the displacement increases, so that the stress at the contacting portions of the tooth surface increases substantially in inverse proportion to the displacement angle, posing the problem that roughening and damaging of the tooth surface easily occur.

SUMMARY OF THE INVENTION

Accordingly, an object of the present invention is to provide a flexible coupling free from the above-discussed problems of the conventional flexible coupling.

Another object of the present invention is to provide a flexible coupling in which precession vibration and the torsional vibration are small even at a high speed rotation and the increase in the stress at the contacting portions is suppressed even when the number of the simultaneous contacting teeth decreased upon the displacement.

With the above objects in view, according to the flexible coupling of the present invention, the out teeth are crowned in such a manner that a tooth surface at a section along a pitch circle cylinder passes through a tooth surface at the center of a tooth width, a tangent line in the direction of the axis of the pitch circle contacting at a position at which the tooth surface is to be contacted with the inner tooth gear, when the angle between the inner and outer gear teeth is at an allowable displacement angle, extends within the pitch circle cylinder at the allowable displacement angle with respect to the direction of axis of the pitch circle cylinder and extends through a point separated from the center of the tooth surface of the outer tooth gear by an amount equal to one half of a backlash, and that the tooth surface at the section along a pitch circle cylinder defining an outwardly convex curve, the curve having a radius of curvature that becomes larger as the point on the curve approaches the tooth end.

According to another flexible coupling of the present invention, the outer tooth are crowned in such a manner that, a tooth surface at a section along a pitch circle cylinder passes through a tooth surface at the center of a tooth width, a tangent line in the direction of the axis of the pitch circle contacting at a position at which the tooth surface is to be contacted with the inner tooth gear, when the angle between the inner and outer gear teeth is at an allowable displacement angle, extends within the pitch circle cylinder at the allowable displacement angle with respect to the direction of axis of the pitch circle cylinder and extends through a point separated from the center of the tooth surface of the outer teeth gear by an amount equal to one half of a backlash; and that the tooth surface at the section along a pitch circle cylinder defining an outwardly convex curve, the curve being an exponential curve expressed by the equation given bellow:

$$Y = m \cdot X^n \quad \text{(Equation 1)}$$

where, Y: crowning curve having an origin (O) at the tooth surface at the center of the tooth thickness, X: axial distance from the origin (O) at the tooth surface at the center of the tooth thickness, and m: factor n: exponential number According to another flexible coupling of the present invention, the outer teeth are crowned in such a manner that, a tooth surface at the section along a pitch circle cylinder defining an exponential curve expressed by the equation 1 given bellow with the origin of the curve falling on the apex of an reference polygon at the center of the tooth width, the reference polygon being an imaginary polygon in which no backlash is provided at the center of a tooth width and in which the displacement angle in the axial direction of the tooth surface is an allowable displacement angle, and with the position at which the tooth surface is brought into contact with the inner tooth gear at the allowable displacement angle is in contact with the sides of the outer contacting polygon which being an imaginary polygon having sides positioned outside of the sides of the reference polygon by an amount equal to ½ of the backlash $$= m \cdot X^n \quad \text{(Equation 1)}$$

where, Y: crowning curve having an origin (O) at the tooth surface at the center of the tooth thickness, X: axial distance from the origin (O) at the tooth surface at the center of the tooth thickness, and m: factor n: exponential number According to still another flexible coupling of the present invention, the outer teeth are crowned in such a manner that, a tooth surface at the section along a pitch circle cylinder defining an exponential curve expressed by the equation 1 given bellow with the factor m and the exponential n being obtained in such a manner that, a reference polygon in which no backlash is provided at the center of the tooth width and in contact with the tooth surface at the center of the tooth width and in which the inclination angle in the tooth width direction is the allowable displacement angle is used to make an imaginary outer-contacting polygon which has sides parallel to and outwardly shifted by an ½ of the backlash from the opposite sides of the reference polygon, the contact position at which the tooth surface is brought into contact at the allowable displacement angle is provided on the sides of the outer-contacting polygon, substituting the coordinates of two points positioned on the sides of the outer-contacting polygon into the equation 3 obtained from the equations 1 and 2 to obtain the exponential n and to obtain the factor m by the equation 4 obtained by deforming the equation 1.

$$Y = m \cdot X^n \quad \text{(Equation 1)}$$

$$n = \frac{\ln(Y2/Y1)}{\ln(X2/X1)} \quad \text{(Equation 3)}$$

$$m = Y1 / X1^n \quad \text{(Equation 4)}$$

where, Y: crowning curve having an origin (O) at the tooth surface at the center of the tooth thickness, X: axial distance from the origin (O) at the tooth surface at the center of the tooth thickness, and m: factor n: exponential number According to a further flexible coupling of the present invention, the outer teeth are crowned in such a manner that, a tooth surface at the section along a pitch circle cylinder defining an exponential curve expressed by the equation 1 given bellow with the factor m and the exponential n being obtained in such a manner that, a reference polygon in which no backlash is provided at the center of the tooth width and in contact with the tooth surface at the center of the tooth width and in which the inclination angle in the tooth width direction is the allowable displacement angle is used to make an imaginary outer-contacting polygon which has sides parallel to and outwardly shifted by an ½ of the backlash from the opposite sides of the reference polygon, the contact position at which the tooth surface is brought into contact at the allowable displacement angle is provided on the sides of the outer-contacting polygon, and obtaining the exponential n by the equation 6 of a tangent line coincide with the side of the reference polygon and the equation 5 composed of the distance to the position at which the contact takes place at the allowable displacement angle from the center of the tooth width in the direction of the tooth width, the allowable inclination angle and the backlash, obtaining the factor m by the equation 7.

$Y = m \cdot X^n$ (Equation 1)

$dY/dX = m \cdot n \cdot X^{(n-1)}$ (Equation 2)

$yw = \tan \beta w \cdot xw - (G/2)$ (Equation 5)

$n = \tan \beta w \cdot xw / yw$ (Equation 6)

$m = yw / xw^n$ (Equation 7)

where, Y: crowning curve having an origin (O) at the tooth surface at the center of the tooth thickness, X: axial distance from the origin (O) at the tooth surface at the center of the tooth thickness, and m: factor n: exponential number βw: the allowable displacement angle G: backlash xw: the point at which the tooth is brought into contact with the inner tooth gear of the sleeve at the allowable displaced angle βw from the center of the tooth width.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE INVENTION

Figure 1:
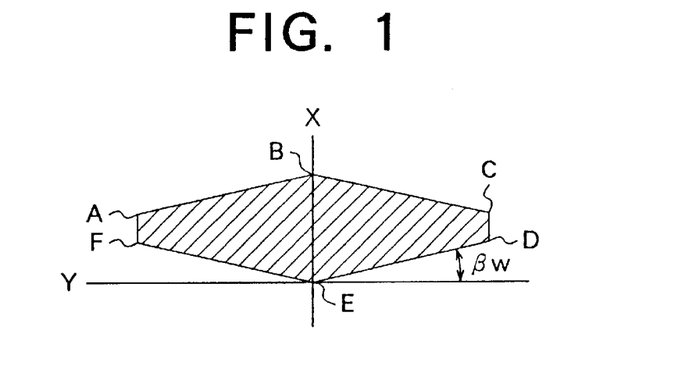
FIG. 1 is a tooth shape sectional view to be used as a base for the pitch circle diameter portion of the outer tooth gear of the pinion of the flexible coupling of the present invention.
Figure 2:
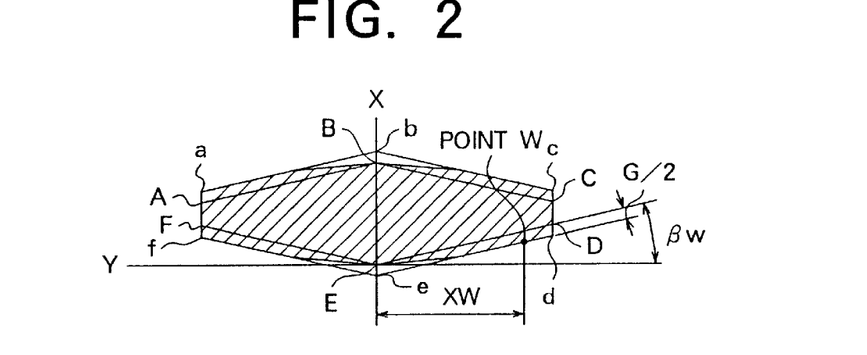
FIG. 2 is a tooth shape sectional view at the pitch circle diameter portion of the outer tooth gear of the pinion of the flexible coupling of the present invention.

In order to reduce the precession vibration and torsional vibration of the flexible coupling rotating at a high speed, it is important to minimize the backlash at the meshing portion of the gears. FIGS. 1 and 2 are views for explaining how the crowning curve of the tooth surface of the outer tooth gear of the pinion of the flexible coupling is determined. The general structure of the flexible coupling may be identical to that of the flexible coupling illustrated in FIG. 7 except for the tooth shape.

FIG. 1 illustrates an ideal tooth shape for allowing the flexure of the flexible coupling at the allowable displacement angle with no backlash, the polygon ABCDEF in FIG. 1 being an ideal tooth shape which realizes no backlash at the pitch circle diameter S and βw being an allowable displacement angle or inclination angle. With such the tooth shape, the gear teeth of the outer and inner tooth gears in the plane perpendicular to the direction of displacement of the gears mesh with each other with no backlash therebetween. However, the gear teeth are in contact with each other only at the apex at the center of the tooth width, generating a very large local stress at this contacting apex portion, so that, although this contacting portion may be quickly worn and rounded to slightly moderate the stress during operation, the contacting portion does not shift from the above contacting portion, resulting in a large stress fatigue which makes the performance of the flexible coupling not practical.

According to the flexible coupling the present invention shown in FIG. 2, a backlash is provided in the meshing portion of the gear teeth of the outer tooth gear of the pinion and the inner tooth gear of the sleeve and the arrangement is such that, when the axes of the sleeve and the pinion are angularly displaced relative to each other, the point of contact between the tooth surfaces shifts toward the tooth width end as the displacement angle increases and that the radius of curvature of the tooth surface becomes larger in the direction toward the tooth width end, i.e., the larger the distance from the center of the tooth width, the larger the radius of curvature of the tooth surface. FIG. 2 is also a tooth shape explanation diagram for explaining how the backlash of the outer tooth gear of the pinion in which the central portion of the tooth surface is rounded for suppressing the contacting portion stress within an allowable limit is determined.

According to this method, a polygon identical to the polygon shown in FIG. 1 is used as the reference polygon ABCDEF, each of the sides AB, BC, DE, EF of the reference polygon ABCDEF being added with ½ of the backlash G to imaginarily make an outer-contacting polygon abcdef of which sides are parallel to the sides AB, BC, DE, EF, respectively, of the reference polygon ABCDEF. The curve along which the gear teeth are to be crowned is a function curve which is within the range of ½ of the added backlash G, passes through the points of origin of the apex E or B of the reference polygon ABCDEF at the central portion of the tooth width, causes the gear tooth to contact at the allowable displacement angle βw and at the tooth width ends in the sides ab and de or be and ef of the outer polygon abcdef, convex in the direction of thickness of the gear tooth and which has a radius of curvature that becomes larger as the point on the curve approaches to the gear width end.

Thus, the tooth shape of the outer gear of the pinion is defined according to the curve that is limited within the small backlash, convex in the direction of tooth width and that has a larger radius of curvature at the tooth width end. Accordingly, even when the flexible coupling is rotating at a high speed, the precession vibration and the torsional vibration can be suppressed to be small. Also, since the radius of curvature is proportionally larger as the point approaches to the gear width end and the point of contact shifts in the direction of the gear width as the displacement angle increases, even when the contacting gear number decreases when displaced, the increase in the contacting stress is suppressed and a larger power can be transmitted as compared to the conventional design.

Figure 3:
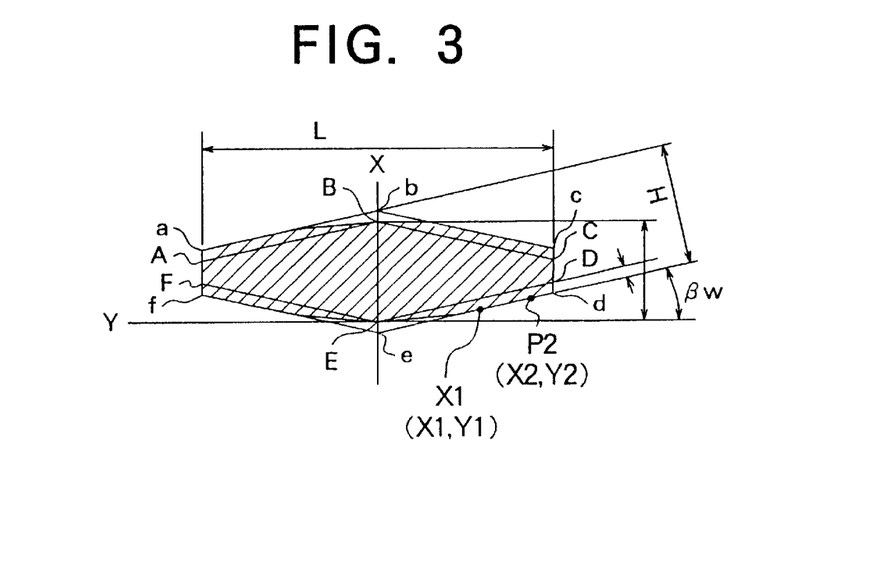
FIG. 3 is a tooth shape sectional view for determining the tooth shape curve.
Figure 4A:
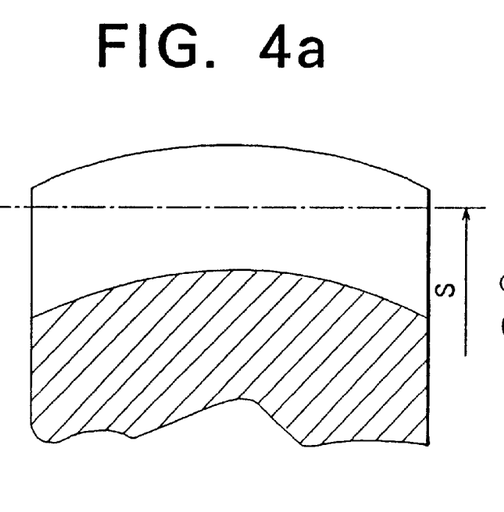
FIG. 4 is a side view of the tooth shape shown in FIG. 3.
Figure 4B:
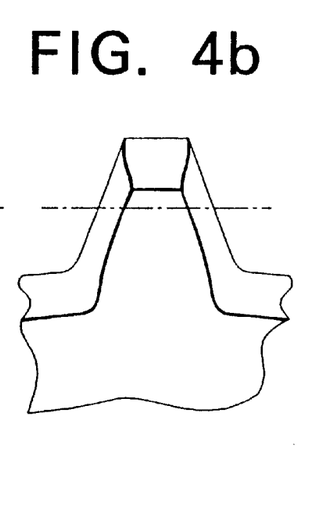
Figure 5:
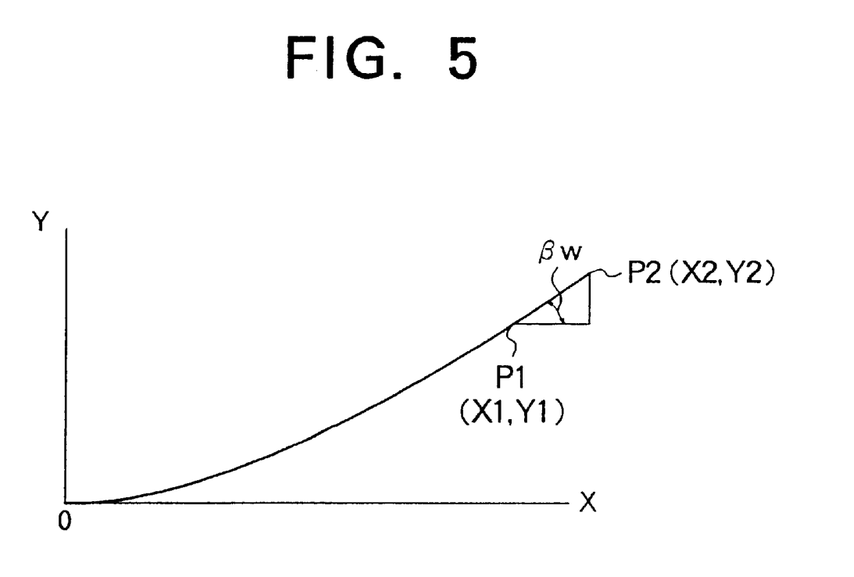
FIG. 5 is an explanatory view for showing the manner in which the factor and the exponential of the exponential function showing the tooth shape are obtained.
Figure 6:
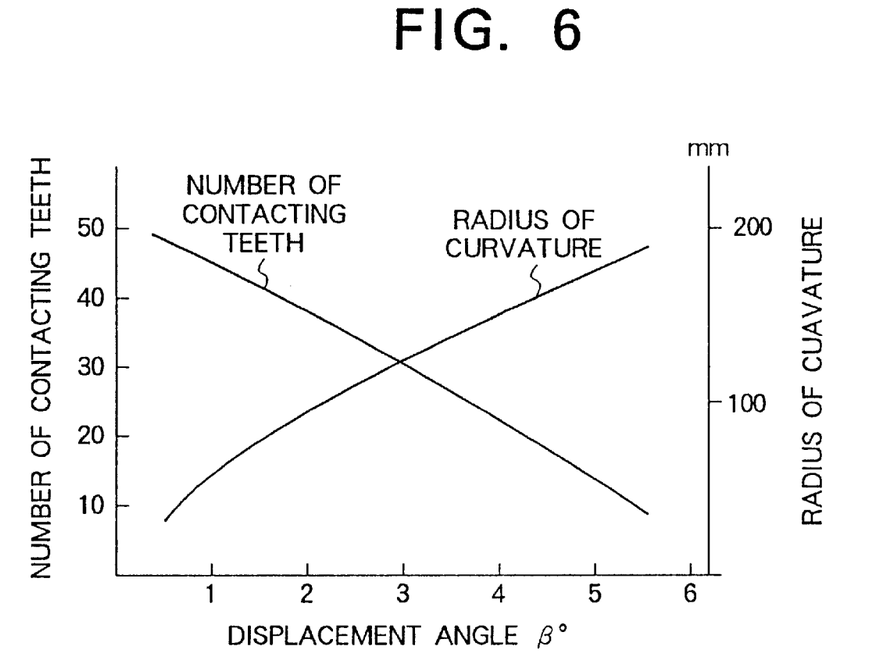
FIG. 6 is a view showing the relationship between the displacement angle of the engagement portion and the simultaneous contacting tooth number and the radius of curvature of the present invention.

In the second embodiment of the flexible coupling of the present invention shown in FIG. 3, the backlash at the meshing portion between the outer tooth gear of the pinion and the inner tooth gear of the sleeve is made small and the crowning curve at the cylindrical section taken along the pitch circle cylinder of the outer tooth gear of the pinion is made as an exponential curve. The other structure of the flexible coupling may be identical to the conventional design shown in FIG. 7. As in the first embodiment and as shown in FIG. 2, a polygon identical to the polygon shown in FIG. 1 is used as the reference polygon ABCDEF, each of the sides AB, BC, DE, EF of the reference polygon ABCDEF being added with ½ of the backlash G to imaginarily make an outer polygon abcdef of which sides are parallel to the sides AB, BC, DE, EF, respectively, of the reference polygon ABCDEF. The curve along which the gear teeth are to be crowned is a function curve which is within the range of ½ of the added backlash G, has the points of origin of the apex E or B of the reference polygon ABCDEF at the central portion of the tooth width, causes the gear tooth to contact at the allowable displacement angle βw and at the tooth width ends in the sides ab and de or be and ef of the outer polygon abcdef, convex in the direction of thickness of the gear tooth and which can be expressed by the equation 1 given below. The displacement angle at each point on the curve of the equaltion 1 is given by equation 2 which is a differential of the equation 1.

$$Y = m \cdot X^n \quad \text{(Equation 1)}$$

$$dY/dX = m \cdot n \cdot X^{(n-1)} \quad \text{(Equation 2)}$$

The factor m and exponential n of the equation 1 are values for satisfying the condition in which the curve of the exponential function 1 contacts the side de of the outer contacting polygon abcdef when the curve passes through the apex E of the reference polygon ABCDEF and at the allowable displacement angle βw. In order to determine the factor m and the exponential n, as shown in FIG. 3, a reference polygon ABCDEF and an outer-contacting polygon abcdef having sides parallel to the side DE of the reference polygon ABCDEF similar to those shown in FIG. 2 are assumed, the position of the side de at which it is brought into contact at the allowable displacement angle βw is selected on the side de of the outer-contacting polygon 1, and two points P1 (X1, Y1) and P2 (X2, Y2) are selected in the vicinity of that point on that side de. The respective positions, of the points of coordinates P1 and P2 are substituted for in the equations 1 and 2, and the X value and Y value of the points of coordinates at P1 and P2 is substituted for in the equations 3 and 4 which are obtained from the equations of two points and calculated to obtain the exponential n, which is substituted for into equation 4 obtained by modifying the equation 1 to obtain the factor m, whereby the crowning curve can be determined.

$$n = \frac{\ln(Y2/Y1)}{\ln(X2/X1)} \quad \text{(Equation 3)}$$

$$m = Y1/X1^n \quad \text{(Equation 4)}$$

The exponential function curve of equation 1 of the factor m and the exponential n obtained from equations 3 and 4 has an allowable displacement angle βw slightly smaller than the theoretical value but in practice this value can be treated as an allowable displacement angle βw because the points P1 and P2 are on the substantially straight line region of the function. The exponential function curve shown in equation 1 of the factor m and the exponential n has a varying radius of curvature that becomes greater as the point on the curve approaches the tooth width ends.

Thus, since the crowning curve of the tooth shape of the outer tooth gear is an exponential function curve that is within a small backlash and passing through the tooth surface of the central region of the tooth width, even when the flexible coupling is rotating at a high speed, the precession vibration and the torsional vibration can be suppressed to be small, and the factor m and the exponential n of the curve can be easily obtained from two points on the side of the outer-contacting polygon. Also, as for the engagement state, the radius of curvature is larger as the point on the curve approaches to the gear width end, and the point of contact shifts in the direction of the gear width as the displacement angle increases, even when the contacting gear number decreases when displaced, the increase in the contacting stress is suppressed and a larger power can be transmitted as compared to the conventional design.

In third embodiment of the present invention the factor m and the exponential n of the exponential function of the crowning curve are obtained by another process. According to this process, similarly to the first and the second embodiments, as shown in FIG. 2, a polygon identical to the ideal polygon ABCDEF shown in FIG. 1 is used as the reference polygon ABCDEF, each of the sides AB, BC, DE, EF of the reference polygon ABCDEF being added with ½ of the backlash G to imaginarily make an outer polygon abcdef of which sides are parallel to the sides AB, BC, DE, EF, respectively, of the reference polygon ABCDEF. The curve along which the gear teeth are to be crowned is a function curve which is within the range of ½ of the added backlash G, has the points of origin of the apex E or B of the reference polygon ABCDEF at the central portion of the tooth width, causes the gear tooth to contact at the allowable displacement angle βw and at the tooth width ends in the sides ab and de or bc and ef of the outer polygon abcdef, convex in the direction of thickness of the gear tooth and which has the exponential function of equation 1 given bellow and the same as that of the first embodiment.

In the third embodiment, the exponential n and the factor m of the exponential function of equation 1 are obtained by the following process. Firstly, the position of contact at the allowable displacement angle βw is set on a point W in the vicinity of the tooth width end on the side de of the outer contacting polygon abcdef and the exponential n and the factor m are obtained from the point of coordinate of this set position. The crowning curve is an exponential function of the equation 1 given below, and the displacement angle of the tangent line at the respective points is expressed by equation 2, and the coordinates of the contacting position upon the allowable displacement angle βw in the direction of tooth thickness when it is assumed that the distance between the contacting point and the center of tooth width is xw can be obtained by the equation 5, and the exponential n and the factor m can be obtained from the equation 6 and the equation 7, respectively, by substituting xw and yw for X and Y, respectively, of the equations 1 and 2.

$Y = m \cdot X^n$ (Equation 1)

$dY/dX = m \cdot n \cdot X^{(n-1)}$ (Equation 2)

$yw = \tan \beta w \cdot xw - (G/2)$ (Equation 5)

$n = \tan \beta w \cdot xw / yw$ (Equation 6)

$m = yw / xw^n$ (Equation 7)

Thus, since the crowning curve of the tooth shape of the outer tooth gear is an exponential function curve that is within a small backlash and passing through the central region of the tooth width, even when the flexible coupling is rotating at a high speed, the precession vibration and the torsional vibration can be suppressed to be small, and the factor m and the exponential n of the curve can be easily and precisely obtained from the coordinates of a contacting point set on a side of an outer contacting polygon. Also, as for the engagement state, the radius of curvature is larger as the point on the curve approaches to the gear width end, and the point of contact shifts in the direction of the gear width end as the displacement angle increases, so that even when the contacting gear number decreases when displaced, the increase in the contacting stress is suppressed and a larger power can be transmitted as compared to the conventional design.

According to the flexible coupling of the present invention, the tooth shape of the outer gear of the pinion is defined according to the curve that is limited within the small backlash, convex in the direction of tooth width and that has a larger radius of curvature at the tooth width end, so that, even when the flexible coupling is rotating at a high speed, the precession vibration and the torsional vibration can be suppressed to be small and, since the radius of curvature is proportionally larger as the point approaches to the gear width end and the point of contact shifts in the direction of the gear width as the displacement angle increases, even when the contacting gear number decreases when displaced, the increase in the contacting stress is suppressed and a larger power can be transmitted as compared to the conventional design.

According to another flexible coupling of the present invention, the crowning curve of the tooth shape of the outer gear of the pinion is defined according to the curve that is limited within the small backlash and has a larger radius of curvature at the tooth width end, so that, even when the flexible coupling is rotating at a high speed, the precession vibration and the torsional vibration can be suppressed to be small and, since the radius of curvature is proportionally larger as the point approaches to the gear width end and the point of contact shifts in the direction of the gear width as the displacement angle increases, even when the contacting gear number decreases when displaced, the increase in the contacting stress is suppressed and a larger power can be transmitted as compared to the conventional design.

According to a further flexible coupling of the present invention, the crowning curve of the tooth shape of the outer tooth gear is an exponential function curve which passes through the center of the tooth width within the backlash and the contacting point at the allowable displacement angle is on the sides of the outer-contacting polygon, and the backlash is made small, so that, even when the flexible coupling is rotating at a high speed, the precession vibration and the torsional vibration can be suppressed to be small and, since the radius of curvature is proportionally larger as the point approaches to the gear width end and the point of contact shifts in the direction of the gear width as the displacement angle increases, even when the contacting gear number decreases when displaced, the increase in the contacting stress is suppressed and a larger power can be transmitted as compared to the conventional design.

According to a still another flexible coupling of the present invention, the crowning curve of the tooth shape of the outer tooth gear is an exponential function curve that is within a small backlash and passing through the tooth surface of the central region of the tooth width, so that, even when the flexible coupling is rotating at a high speed, the precession vibration and the torsional vibration can be suppressed to be small, and the factor m and the exponential n of the curve can be easily obtained from two points on the side of the outer-contacting polygon. Also, as for the engagement state, the radius of curvature is larger as the point on the curve approaches to the gear width end, and the point of contact shifts in the direction of the gear width as the displacement angle increases, even when the contacting gear number decreases when displaced, the increase in the contacting stress is suppressed and a larger power can be transmitted as compared to the conventional design.

According to the flexible coupling of the present invention, the crowning curve of the tooth shape of the outer tooth gear is an exponential function curve that is within a small backlash and passing through the central region of the tooth width, through the use of an imaginary reference polygon and an outer-contacting polygon in which a small backlash is added to the sides of the reference polygon, so that factor m and the exponential n of the exponential function can be easily obtained from the contacting position on the sides of the outer-contacting polygon at the allowable displacement angle and, even when the flexible coupling is rotating at a high speed, the precession vibration and the torsional vibration can be suppressed to be small. Also, as for the engagement state, the radius of curvature is larger as the point on the curve approaches to the gear width end, and the point of contact shifts in the direction of the gear width end as the displacement angle increases, so that even when the contacting gear number decreases when displaced, the increase in the contacting stress is suppressed and a larger power can be transmitted as compared to the conventional design.

What is claimed is:

1. A flexible coupling adapted to be mounted to rotary shafts, said coupling comprising:

a pair of pinions, each having an outer tooth gear thereon; and a sleeve having a pair of inner tooth gears engaged with said outer tooth gears for transmitting power between the rotary shafts;

wherein said outer tooth gears include a plurality of outer teeth, each of said outer teeth being crowned;

wherein each of said outer teeth includes opposing tooth crowned surfaces defining therebetween a tooth thickness and opposing tooth side surfaces defining therebetween a tooth width, wherein each of said tooth crowned surfaces defines a tooth surface at a section along a pitch circle cylinder passing through said respective outer tooth at the center of a tooth width;

each of said tooth crowned surfaces further defining an outwardly convex curve, said curve having a radius of curvature that becomes larger as a point on said curve approaches said respective opposing tooth side surface.

2. A flexible coupling as claimed in claim 1, wherein a tangent line in the direction of the axis of the pitch circle cylinder contacting at a position at which the tooth surface is to be contacted with the inner tooth gear, when the angle between the inner and outer gear teeth is at an allowable displacement angle, extends within the pitch circle cylinder at the allowable displacement angle with respect to the direction of axis of the pitch circle cylinder and extends through a point separated from the center of the tooth surface of said outer tooth gear by an amount equal to one half of a backlash, given below by equation (8):

$$G = (2 \cdot R_c - T) \cdot (1 - \cos \beta w) \quad \text{(Equation 8)}$$

where, G: backlash, $R_c$: radius of crowning curve,

T: thickness of tooth, and $\beta w$: the allowable displacement angle.

3. A flexible coupling adapted to be mounted to rotary shafts, said coupling comprising:

a pair of pinions, each having an outer teeth gear thereon; and a sleeve having a pair of inner teeth gears engaged with said outer teeth gears for transmitting power between the rotary shafts;

wherein said outer teeth gears include a plurality of outer teeth, each of said outer teeth being crowned;

wherein each of said outer teeth includes opposing tooth crowned surfaces defining therebetween a tooth thickness and opposing tooth side surfaces defining therebetween a tooth width, wherein each of said tooth crowned surfaces defines a tooth surface at the section along a pitch circle cylinder, said tooth surface defining an outwardly convex curve having a radius of curvature that becomes larger as a point on said curve approaches said respective opposing tooth side surface, said curve defining an exponential curve expressed by the equation 1 given below with the origin of the curve falling on the apex of a reference polygon at the center of the tooth width, said reference polygon being an imaginary polygon in which no backlash is provided at the center of the tooth width and in which a displacement angle in the axial direction of the tooth surface is an allowable displacement angle, and with the position at which the tooth surface is brought into contact with the inner tooth gear at the allowable displacement angle is in contact with the sides of said imaginary polygon which are positioned outside of the sides of said reference polygon by an amount equal to one-half of the backlash given below by equation (8):

$$Y = m \cdot X^n \quad \text{(Equation 1)}$$

$$G = (2R_c - T) \cdot (1 - \cos \beta w) \quad \text{(Equation 8)}$$

where, Y: crowning curve having an origin (O) at the tooth surface at the center of the tooth thickness, X: axial distance from the origin (O) at the tooth surface at the center of the tooth thickness, m: factor, n: exponential number, G: backlash, $R_c$: radius of crowning curve, T: thickness of tooth, and $\beta w$: the allowable displacement angle.

4. A flexible coupling as claimed in claim 3, wherein said tooth surface at the section along the pitch circle cylinder defines the exponential curve expressed by the equation 1 given below, wherein the factor m and the exponential n are obtained such that the reference polygon in which no backlash is provided at the center of the tooth width and in contact with the tooth surface at the center of the tooth width and in which an inclination angle in the tooth width direction is the allowable displacement angle is used to make said imaginary polygon, said imaginary polygon defining an outer-contacting polygon which has sides parallel to and outwardly shifted by one-half of said backlash from the opposite sides of said reference polygon, and a contact position at which the tooth surface is brought into contact at the allowable displacement angle is provided on the sides of the outer-contacting polygon, substituting the coordinates of two points positioned on the sides of the outer-contacting polygon into the equation 3 obtained from the equations 1 and 2 to obtain the exponential n and to obtain the factor m by the equation 4 obtained by deforming the equation 1:

$$Y = m \cdot X^n \quad \text{(Equation 1)}$$

$$dY/dX = m \cdot n \cdot X^{(n-1)} \quad \text{(Equation 2)}$$

$$n = \frac{\ln[Y2/Y1]}{\ln[X2/X1]} \quad \text{(Equation 3)}$$

$$m = Y1/X1^{11}$$

where, Y: crowning curve having an origin (O) at the tooth surface at the center of the tooth thickness, X: axial distance from the origin (O) at the tooth surface at the center of the tooth thickness, m: factor, and n: exponential number.

5. A flexible coupling as claimed in claim 3, wherein said tooth surface at the section along the pitch circle cylinder defines the exponential curve expressed by the equation 1 given below, wherein the factor m and the exponential n are obtained such that the reference polygon in which no backlash is provided at the center of the tooth width and in contact with the tooth surface at the center of the tooth width and in which an inclination angle in the tooth width direction is the allowable displacement angle is used to make said imaginary polygon, said imaginary polygon defining an outer-contacting polygon which has sides parallel to and outwardly shifted by one-half of said backlash from the opposite sides of said reference polygon, and a contact position at which the tooth surface is brought into contact at the allowable displacement angle is provided on the sides of the outer-contacting polygon, and obtaining the exponential n by the equation 6 of a tangent line coincide with the side of the reference polygon and the equation 5 composed of the distance to the position at which the contact takes place at the allowable displacement angle from the center of the tooth width in the direction of the tooth width, the allowable inclination angle and the backlash, obtaining the factor m by the equation 7, $$Y = m \cdot X^n \quad \text{(Equation 1)}$$

$$dY/dX = m \cdot n \cdot X^{(n-1)} \quad \text{(Equation 2)}$$

$$yw = \tan \beta w \cdot xw - (G/2) \quad \text{(Equation 5)}$$

$$n = \tan \beta w \cdot xw / yw \quad \text{(Equation 6)}$$

$$m = yw / xw^n \quad \text{(Equation 7)}$$

where, Y: crowning curve having an origin (O) at the tooth surface at the center of the tooth thickness,
X: axial distance from the origin (O) at the tooth surface at the center of the tooth thickness,
m: factor,
n: exponential number,
βw: the allowable displacement angle,
G: backlash, and
xw: the point at which the tooth is brought into contact with the inner tooth gear of the sleeve at the allowable displaced angle βw from the center of the tooth width.

6. A flexible coupling adapted to be mounted to rotary shafts, said coupling comprising:
a pair of pinions, each having an outer tooth gear thereon; and
a sleeve having a pair of inner tooth gears engaged with said outer tooth gears for transmitting power between the rotary shafts;
wherein said outer tooth gears include a plurality of outer teeth, each of said teeth being crowned;
wherein each of said outer teeth includes opposing tooth crowned surfaces defining therebetween a tooth thickness and opposing tooth side surfaces defining therebetween a tooth width, wherein each of said tooth crowned surfaces defines a tooth surface at a section along a pitch circle cylinder passing through said respective outer tooth at the center of a tooth width;
each of said crowned tooth surfaces further defining an outwardly convex curve, said curve having a radius of curvature that becomes larger as a point on said curve approaches said respective opposing tooth side surface and being an exponential curve expressed by the equation given below:

$$Y = m \cdot X^n \quad \text{(Equation 1)}$$

where, Y: crowning curve having an origin (O) at the tooth surface at the center of the tooth thickness,
X: axial distance from the origin (O) at the tooth surface at the center of the tooth thickness,
m: factor, and
n: exponential number.

7. A flexible coupling as claimed in claim 6, wherein a tangent line in the direction of the axis of the pitch circle cylinder contacting at a position at which the tooth surface is to be contacted with the inner tooth gear, when the angle between the inner and outer gear teeth is at an allowable displacement angle, extends within the pitch circle cylinder at the allowable displacement angle with respect to the direction of axis of the pitch circle cylinder and extends through a point separated from the center of the tooth surface of said outer teeth gear by an amount equal to one half of a backlash, given below by equation (8):

$$G = (2 \cdot R_c - T) \cdot (1 - \cos \beta w) \quad \text{(Equation 8)}$$

where, G: backlash,
$R_c$: radius of crowning curve,
T: thickness of tooth, and
βw: the allowable displacement angle.

* * * * *